United States Patent
Deak, Sr.

(10) Patent No.: US 9,843,248 B2
(45) Date of Patent: Dec. 12, 2017

(54) ROCKER ACTION ELECTRIC GENERATOR

(71) Applicant: David Deak, Sr., Nesconset, NY (US)

(72) Inventor: David Deak, Sr., Nesconset, NY (US)

( * ) Notice: Subject to any disclaimer, the term of this patent is extended or adjusted under 35 U.S.C. 154(b) by 0 days.

(21) Appl. No.: 14/730,714

(22) Filed: Jun. 4, 2015

(65) Prior Publication Data

US 2016/0359401 A1    Dec. 8, 2016

(51) Int. Cl.
*H02K 35/02*    (2006.01)

(52) U.S. Cl.
CPC .................................. *H02K 35/02* (2013.01)

(58) Field of Classification Search
CPC ........ H02K 35/00; H02K 35/02; H02K 35/06; H03K 3/45; H01H 50/643; H01H 51/2227; H01H 51/2272
USPC ......... 310/15, 36, 28, 38; 322/3; 341/20, 32; 290/1 R; 335/205, 207, 236, 296, 297; 336/77, 110
See application file for complete search history.

(56) References Cited

U.S. PATENT DOCUMENTS

| | | | | |
|---|---|---|---|---|
| 1,711,323 A | * | 4/1929 | Oglesby | H02K 35/02 310/36 |
| 3,027,499 A | * | 3/1962 | Holdway | G08B 5/22 335/234 |
| 3,218,523 A | * | 11/1965 | Benson | H01F 7/14 335/234 |
| 3,315,104 A | * | 4/1967 | Barr | H02K 35/06 310/29 |
| 3,348,080 A | * | 10/1967 | Lair | H02K 39/00 310/29 |
| 3,621,419 A | * | 11/1971 | Adams | H01H 51/2272 335/170 |
| 3,671,777 A | * | 6/1972 | Newell | H03K 3/45 327/169 |
| 3,895,244 A | * | 7/1975 | Link | A61N 1/378 310/15 |
| 4,260,901 A | * | 4/1981 | Woodbridge | F03B 13/1855 290/42 |
| 4,703,293 A | * | 10/1987 | Ono | H01H 51/229 335/230 |

(Continued)

FOREIGN PATENT DOCUMENTS

| | | | | |
|---|---|---|---|---|
| DE | 3218181 | * | 11/1983 | ............. H02K 33/12 |
| DE | 102006013237 | * | 10/2007 | ............. H02K 35/02 |

(Continued)

*Primary Examiner* — Burton Mullins
(74) *Attorney, Agent, or Firm* — Joanne M. Martin

(57) ABSTRACT

An extended duration burst electrical energy harvesting generator in one embodiment including two magnets situated on opposite ends of an angular movable lever with a centered fulcrum support in an angular displacement (see-saw) arrangement. The two magnets are under the bi-stable magnetic attractive influence of dual magnetic metal (high permeability) substrates that are disposed at a distance within two separate center core electric coil bobbin forms that are situated under the opposite ends of the lever. Either one of the magnets, in time, will make or break contact with one of the substrates producing an instantaneous induced voltage at each of the coil terminals. The two induced voltages can be utilized to power battery-less and wireless remote communications control function such as ISM Band wireless transmitters and battery-less electronic device applications.

20 Claims, 10 Drawing Sheets

(56) References Cited

U.S. PATENT DOCUMENTS

| | | | | |
|---|---|---|---|---|
| 4,855,699 | A * | 8/1989 | Hoegh | H01H 50/541 |
| | | | | 335/177 |
| 4,866,321 | A * | 9/1989 | Blanchard | H02K 21/24 |
| | | | | 310/112 |
| 5,499,013 | A * | 3/1996 | Konotchick | A61B 17/442 |
| | | | | 340/539.22 |
| 5,608,366 | A * | 3/1997 | Sako | H01H 51/229 |
| | | | | 335/128 |
| 7,015,778 | B2 * | 3/2006 | Fukushima | H02K 33/16 |
| | | | | 335/128 |
| 7,436,082 | B2 * | 10/2008 | Ruse | F03B 13/1875 |
| | | | | 290/42 |
| 7,495,656 | B2 * | 2/2009 | Yuba | H02K 26/00 |
| | | | | 345/161 |
| 7,710,227 | B2 * | 5/2010 | Schmidt | H02K 35/04 |
| | | | | 310/168 |
| 8,148,856 | B2 * | 4/2012 | Bataille | H02K 35/02 |
| | | | | 290/1 R |
| 8,299,659 | B1 * | 10/2012 | Bartol, Jr. | H02K 35/02 |
| | | | | 310/152 |
| 8,514,040 | B2 * | 8/2013 | Gruner | H01H 1/54 |
| | | | | 335/125 |
| 8,624,447 | B2 * | 1/2014 | Cartier Millon | G08C 17/00 |
| | | | | 290/1 R |
| 8,773,226 | B2 * | 7/2014 | Li | H01H 51/2272 |
| | | | | 335/128 |
| 2008/0048506 | A1 * | 2/2008 | Deak | H02K 35/02 |
| | | | | 310/12.22 |
| 2015/0279598 | A1 * | 10/2015 | Matsumoto | H02K 7/1853 |
| | | | | 335/205 |

FOREIGN PATENT DOCUMENTS

| | | | | |
|---|---|---|---|---|
| DE | 102010017874 | * | 10/2011 | H01H 51/22 |
| EP | 0948018 | * | 6/1999 | H01H 51/22 |
| EP | 1936787 | * | 6/2008 | H02K 35/02 |
| EP | 2079154 | * | 7/2009 | H02K 35/02 |
| JP | 2011-130654 | * | 6/2011 | H02K 1/06 |
| WO | 2013-031127 | * | 7/2013 | H02K 35/06 |

\* cited by examiner

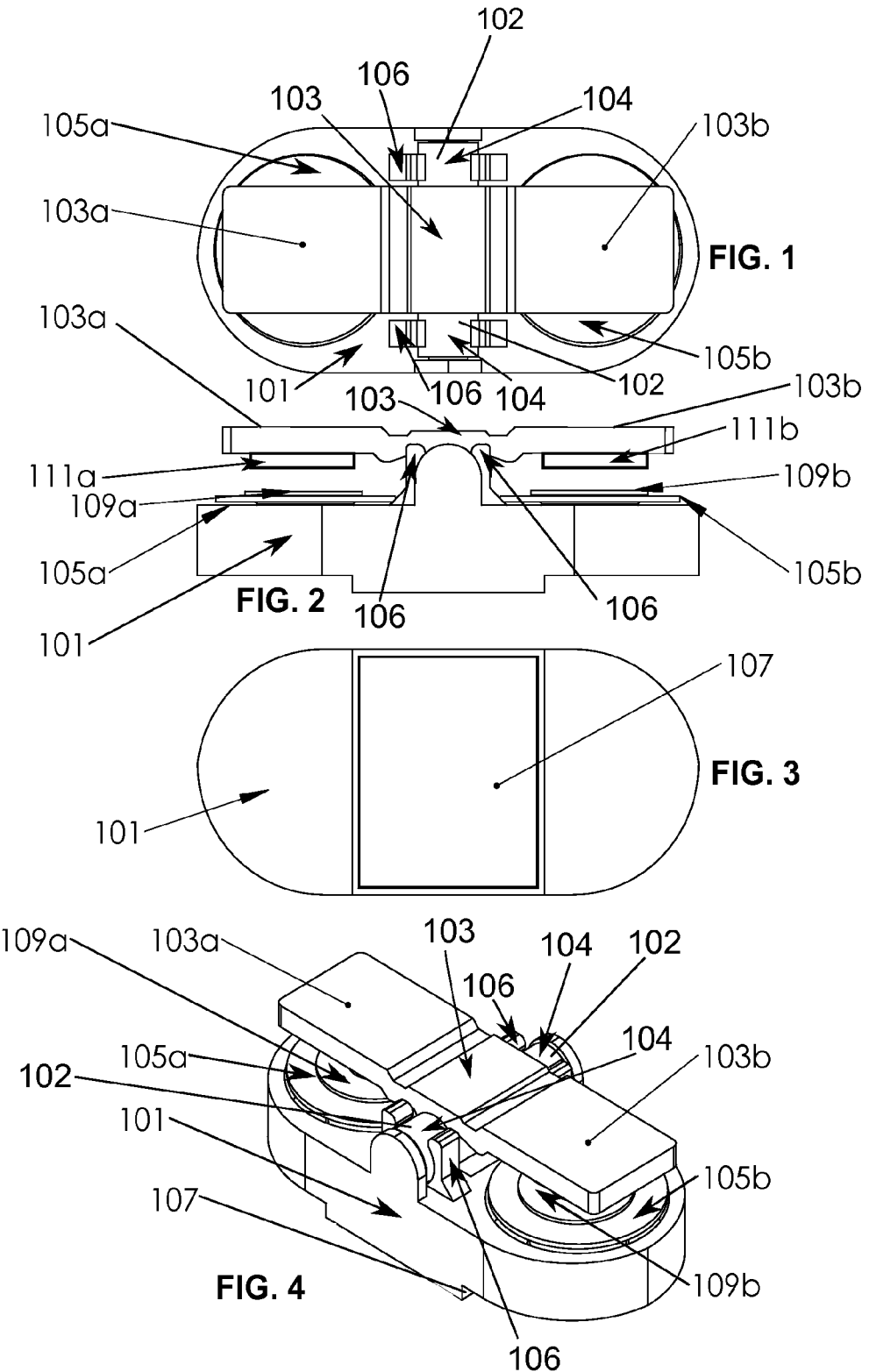

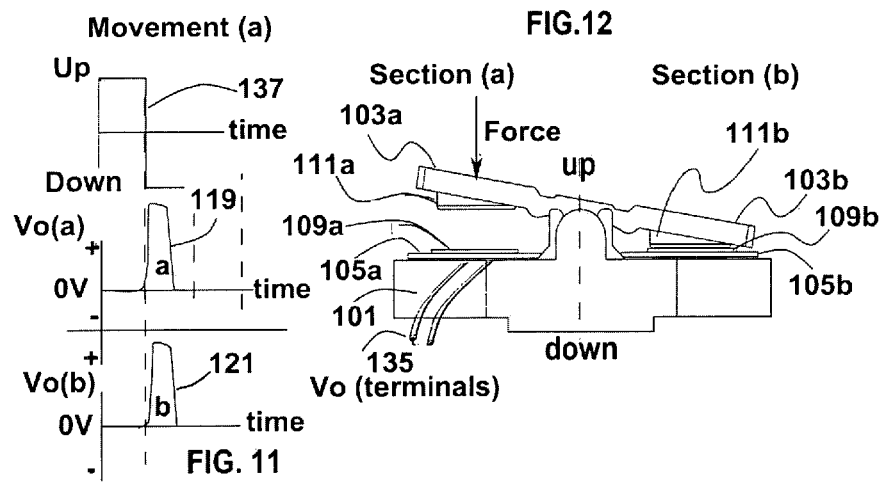
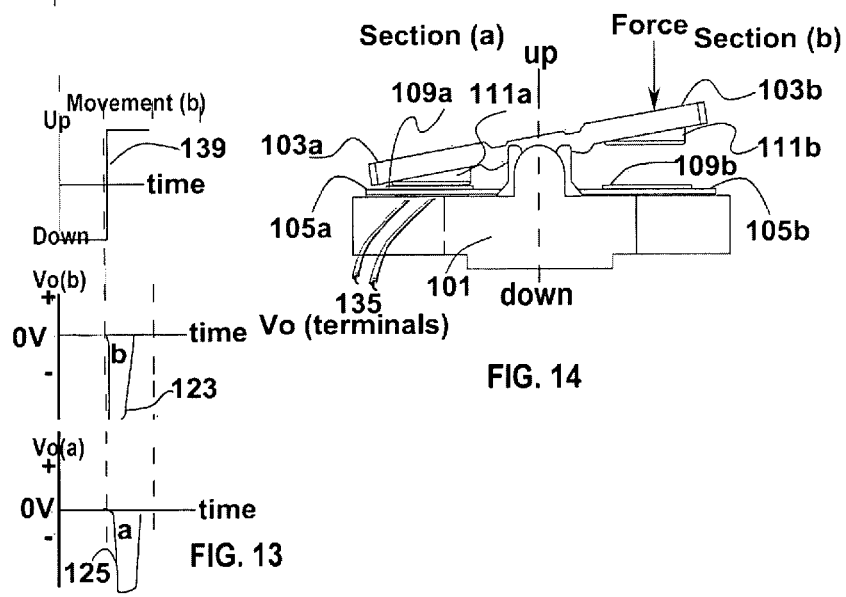

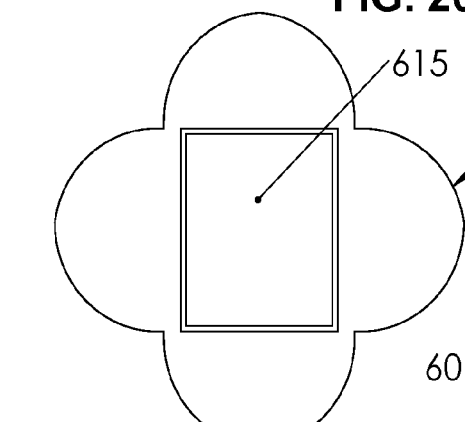
FIG. 20
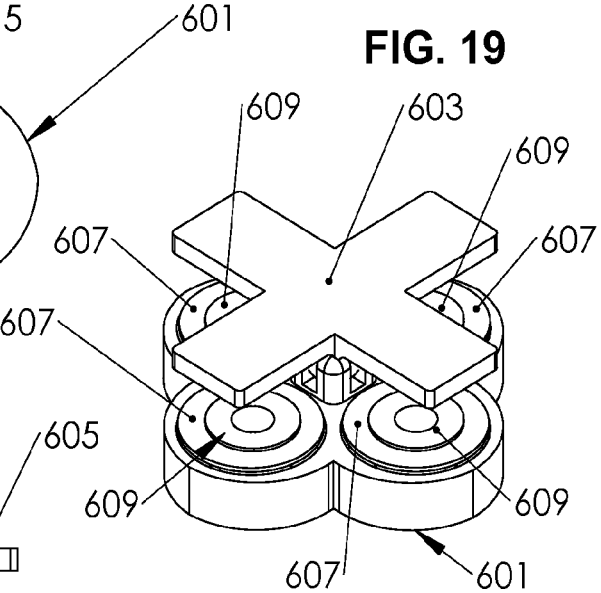
FIG. 19
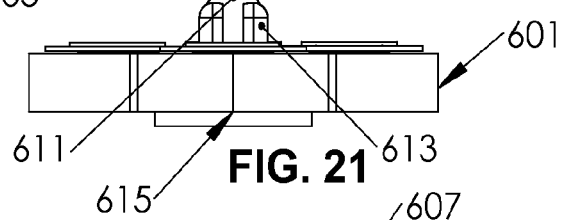
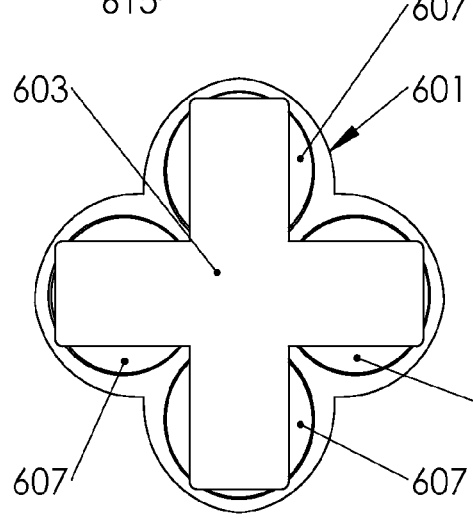
FIG. 21
FIG. 22
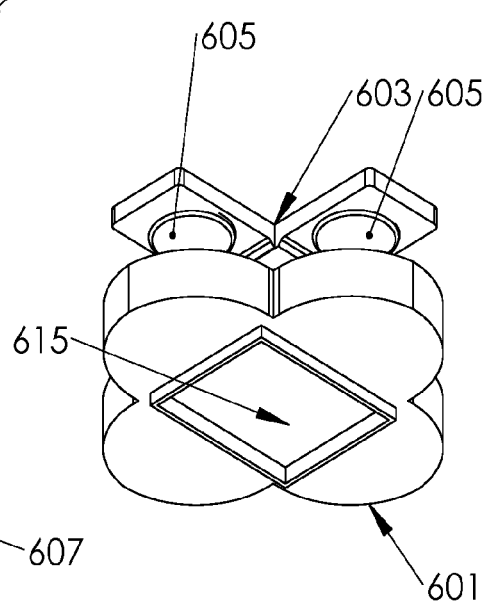
FIG. 23

ROCKER ACTION ELECTRIC GENERATOR

FIELD OF THE INVENTION

The present invention relates to electric generators and the generation of electricity from same, in particular, to energy harvesting electric generators having movable magnets therein.

BACKGROUND OF THE INVENTION

Since the inception of Galvani and later Faraday in 1821 and in 1831 the evolution of electric generators has progressed with the conventional knowledge of moving a coil through a stationary magnetic field or in some demonstrable instances, the motion of a magnet through a stationary coil. However the dominating influence of generators incorporating an internal moving coil about a stationary magnetic field remains the mainstay of global electrical power generation on any scale. Further, in cases of a magnet in motion about a stationary coil, the shape of the magnet(s) is typically of the bar, horseshoe, or other non-spherical magnet shape means and not a magnetic shape of a sphere as part and parcel to the magnet(s).

A few short burst energy harvesters are offered commercially (e.g. ISM Enigma, LLC, New York and Enocean, GmbH, Germany) as energy harvesting generators with an output pulse time duration of 1 to 10 milliseconds or less and a non-sinusoidal transient voltage pulse. Transient voltage pulses differ from the short-duration impulsive noise in that they have a longer duration and a relatively higher proportion of low-frequency energy content, and usually occur less frequently than impulsive noise. The sources of these transient voltage pulses in the prior generators are varied electromagnetic devices that generate an output by quick magnetic pole flipping in a complete closed magnetic circuitous path with an initial pulse of relatively short and has a duration on the order of 1 to 10 milliseconds having limited use; however this can be utilized as a power source for short burst Industrial, Scientific and Medical (hereinafter ISM) Band radio transmitters. This complete closed magnetic circuit is defined as having the opposite poles of a magnet physically and magnetically connected together by a magnetic metal conduit e.g. magnetic steel or iron or other high permeability (relative to air) material so that the bulk of the magnetic field lines are coupled and concentrated within the magnetic metal conduit. In the prior generators, it is only when the magnet's poles are switched into a changed state in some manner; at other times the wire and the magnet are in a high permeability magnetic closed conduit or circuit.

SUMMARY

The present invention provides an extended duration electrical output in response to a bi-directional (or multi-directional) angular displacement centered fulcrum lever where there exists disposed, a plurality of magnets at opposite ends of the centered fulcrum lever. The lever can be a simply elongated beam component or a right angle cross beam component with a plurality of magnets disposed at opposite ends of the cross beam members wherein the path between the magnet(s) pole(s) includes at least one coil of wire, and low and relatively high permeability magnetic path sections. The bi-directional angular displacement centered fulcrum lever component or right angle cross beam component with magnets disposed at opposite ends remain in a state where due to magnetic attraction, a first magnet is in physical and magnetic contact with a magnetic steel center core that is disposed within the center of a coil bobbin comprised of a copper wire coil; and a second magnet, opposite the first, is displaced a finite distance away from a second magnetic steel center core that is disposed within the center of a coil bobbin comprised of a copper wire coil.

When the second magnet that is a finite distance away from the second coil's centered magnetic steel core (and is in mechanical communication the bi-directional angular displacement centered fulcrum lever) is pushed by an external push force from a finger, human or otherwise, applied to the bi-directional angular displacement centered fulcrum lever, an angular displacement state change takes place with the bi-directional angular displacement centered fulcrum lever with the second magnet coming to be in mechanical and magnetic pole contact with the second coil's centered magnetic steel core. This state change collapses the displacement magnetic field traveling through the second coil and concentrates itself within the magnetic steel core centered in the coil winding and induces a voltage pulse that is felt at the coil's terminals. This action instantly causes the first magnet disposed on the opposite end of the center fulcrum lever to instantly move away from its contact position with the first magnetic steel centered core within the first coil winding; and this causes the first concentrated magnetic field in the core to instantly expand outward around the volume of the now displaced finite distance that results from this forced separation by the initial push on the second end of the lever that has disposed the second magnet.

A summary of this alternating, "SEE-SAW" substantially instant action events are that whenever either side of this center fulcrum with opposite end attached magnets are pushed downward, one of the magnets will come in contact with its associated magnetic so steel core centered within its associated coil winding; and the opposite side of the center fulcrum with its associated magnet, will be finite distance displaced from its associated magnetic steel core centered within its associated coil winding. This action instantly establishes an induced voltage pulse in both coil windings of equal and opposite polarity; and if these two coil windings are electrically connected in series aiding the resultant voltage pulse waveform will be algebraically and vectorially additive and with a resultant extended pulse time period.

BRIEF DESCRIPTION OF THE DRAWINGS

These and further features of the present invention will be better understood by reading the Detailed Description, taken together with the Drawings, wherein:

FIG. 1 is a plan view of one embodiment of the present invention;

FIG. 2 is a side view of the embodiment of FIG. 1;

FIG. 3 is a bottom view of the present invention including a compartment for a transmitter circuit module;

FIG. 4 is a perspective view of the present invention according to the embodiment of FIG. 1;

FIG. 11 is a graph representation of the downward movement of the left side of the rocker in response to an applied pushing force applied to section (a) of the rocker and the resultant induced voltage at each of the two coils (corresponding to the two rocker magnets) output terminals;

FIG. 12 shows the position of the rocker previous to an applied downward pushing force;

FIG. 13 is a graph representation of the downward movement of the right side of rocker in response to a pushing force applied to section (b) of the rocker and the resultant induced voltage at each of the two coils output terminals FIG. 14 shows the position of the rocker previous to an applied downward pushing force;

FIG. 19 is a perspective view of a two-dimension ("cross") rocker embodiment of the invention that is capable of the action of UP and DOWN or LEFT and RIGHT movement to generate up to four individual induced voltages in two pairs of separate coils. or four separate control coils;

FIG. 20 is a bottom view of a coil base of the embodiment of FIG. 19, having a recess where an exemplary transmitter circuit module can be inserted;

FIG. 21 is a side view of the embodiment of FIG. 19 illustrating a moveable ball joint retaining the rocker in a two-dimension movement;

FIG. 22 is a top (plan) view of the embodiment of FIG. 19, showing the "cross" rocker member having UP, DOWN and LEFT, RIGHT portions as it is typically positioned relative to the corresponding four coil base;

FIG. 23 is a bottom perspective view of the embodiment of FIG. 19, showing two of the four neodymium disk magnets facing the coil base;

DETAILED DESCRIPTION

Figure 5:
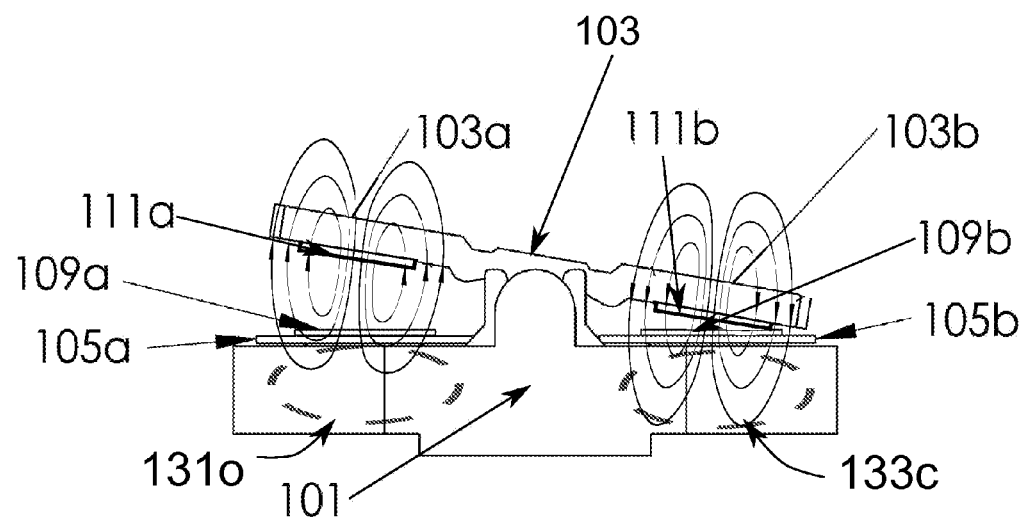
FIG. 5 is a side view of one embodiment of the present invention having a rocker left side separated and right side in a closed magnetic circuit and including magnetic fields around the open left side and the closed right side of the generator embodiment.

FIG. 1, FIG. 2, FIG. 3, & FIG. 4 shows various views of one embodiment of the invention as a see-saw type of rocker generator wherein exists a coil bobbin base 101 on which two individual coils 105a & 105b are disposed and the two coils 105a & 105b can be arranged to have their coil terminal connexions individually available for separate connecting to two separate electrical loads, or they can be connected in an electrical series aiding arrangement to double the output voltage at their combined terminal connexions. Each of the two coils 105a & 105b has their individual hollow magnetic metal centered inner cores 109a & 109b disposed within the center of their respective coils. A snap-in rocker component referenced as a left 103a section and a right 103b section that is moveable and has disposed two individual neodymium magnets, and where each magnet 111a & 111b has a pole facing the coils and inner hollow cores, e.g. the left section has its facing-pole as NORTH and the right section has its pole as SOUTH, or with the converse. Whether NORTH and SOUTH or SOUTH and NORTH or NORTH and NORTH and SOUTH and SOUTH, the coils outputs can still be wired to make it a summed aiding voltage (batteries in series). As seen in FIG. 3, the underside of the coil base 101 has an open compartment or recess 107 within the base 101 to accommodate an ISM Band micro-transmitter circuit module for use as a generator to power same or other related electronic components. The rocker 103 includes a substantially orthogonal member 104 having a surfaces 102 (typically smooth, at least partially cylindrical) which are received into resilient clip members 106 which receive the surfaces 102 and retain the rocker 103 magnets 105a and 105b in proximity to the coil 105a and 105b (or corresponding coils 109a and 109b) but space apart to allow a "rocker" movement wherein one magnet (e.g. 111a) engages core 109a or coil 105a while providing a separation of the oppositely disposed magnet 111b from a corresponding coil 109b or core 105b, wherein the separation is significant to provide a 'snap' action from magnetic engagement of the magnet 105b with a corresponding structure when a force is applied to the left section 103b sufficient to overcome the magnetic bonding of magnet 105a to its engaged structure (e.g. coil 105a, core 109a, etc.).

FIG. 5 shows one static state position of the movable rocker element 103, where its left section 103a is displaced from the coil 105a and the inner magnetic metal hollow core 109a so that there is an 'air gap' and no mechanical and no concentrated magnetic contact between the magnet 111a and the magnetic metal inner core 109a; and where its right section 103b is displaced from the coil 105b and the inner magnetic metal hollow core 109b so that there is an 'no-air gap' and mechanical and concentrated magnetic contact between the magnet 111b and the magnetic metal inner core 109b. The magnetic filed pattern 1310 surrounding the left coil 105a has a minimum flux density with the air gap as compared to the right side surrounding field pattern 133c that has a maximum flux density with no air gap and the right magnet 111b is in magnetic and physical contact with the right hollow inner magnetic metal core 109b centered in the right coil 105b. Another novel feature of the invention is a hollow magnetic metal core 109a & 109b that is used so that the magnetic field concentrated within the walls of the core 109a & 109b creates a more efficient flux distribution and when the magnetic field instantly expands due to rocker movement action a greater magnitude of voltage will be induced. The embodiment is not limited to a hollow core 109a & 109b; and a solid core can be used in place of the hollow core if so desired, but the hollow core 109a & 109b is without a flange and sees a preferable maximum hollow core wall thickness O.D./I.D. (Outside Diameter/Inside Diameter) ratio of 1.5 to 1 and having a substantially uniform outer diameter as being the most efficient wall volume to concentrate the magnetic field contained within it without magnetic reluctance overtaking the efficency and it also reduces the weight of the generator embodiment. Also from a theoretical point of view a hollow core would force the concentration of magnetic flux (field lines of force) to be closest to the coil bobbin thin wall, which means that the magnetic flux will be closest to the coil wires for maximum induced voltage production.

Figure 6:
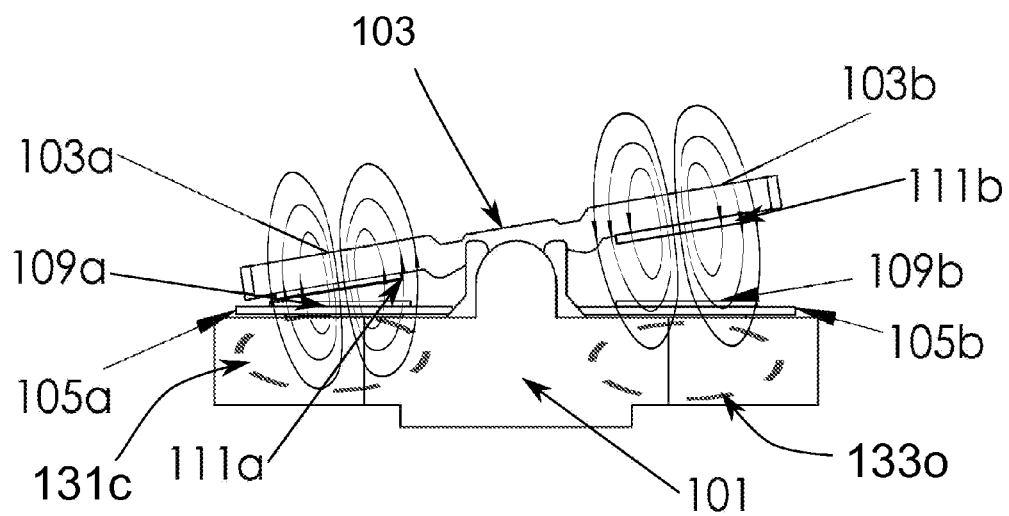
FIG. 6 is an side view of the embodiment of FIG. 5 having a rocker right side separated and left side in a closed magnetic circuit and including magnetic field lines around the open right side and the closed left side of the generator embodiment.

FIG. 6 shows an alternate static state position of the movable rocker element 103, where its right section 103b is displaced from the coil 105b and the inner magnetic metal hollow core 109b so that there is an 'air gap' between the magnet 111b and the magnetic metal inner core 109b; and where its left section 103a is displaced from the coil 105a and the inner magnetic metal hollow core 109a so that there is an 'no-air gap' between the magnet 111a and the magnetic metal inner core 109a. The magnetic filed pattern 131c surrounding the left coil 105a has a maximum flux density with the no air gap as compared to the right side surrounding field pattern 133o that has a minimum flux density with an air gap and the right magnet 111b is displaced from the right hollow inner magnetic metal core 109b centered in the right coil 105b.

Figure 7:
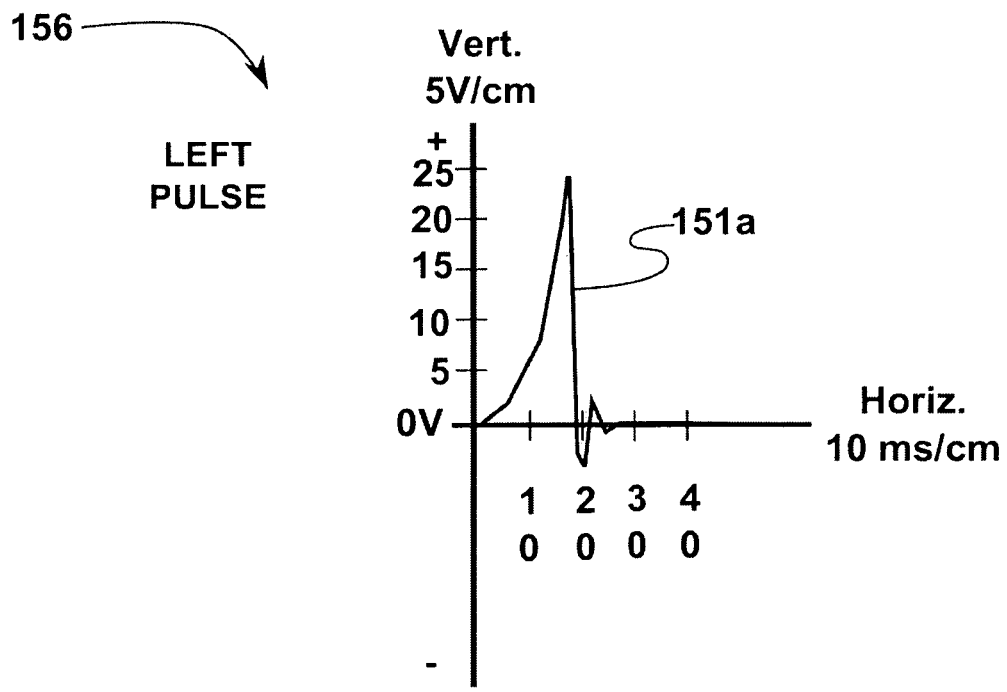
FIG. 7 is an exemplary oscilloscope trace illustration of the rocker generator embodiment of FIG. 5, showing the voltage pulse generated, at the coil terminals, as the 'left side' of the rocker is closed.

Considering that in the exemplary embodiment of FIGS. 5 & 6, the left magnet 111a has its NORTH POLE facing the magnetic metal center hollow core 109a and in FIGS. 5 & 6 the right magnet has its SOUTH POLE facing the magnetic metal center hollow core 109b. FIG. 7 is a oscilloscope trace graphic representation 156 of the left coil 105a (shown in FIGS. 5 & 6) output pulse generated from movement from the magnet 111a position in FIG. 5 to the position shown in FIG. 6 where the magnet 111a comes in contact with hollow magnetic metal center core 109a resulting in a pulse 153 produced by the right coil 105a during the time that magnet 111b separates from the center magnetic metal core 109b to produce an 'air gap.'

Figure 8:
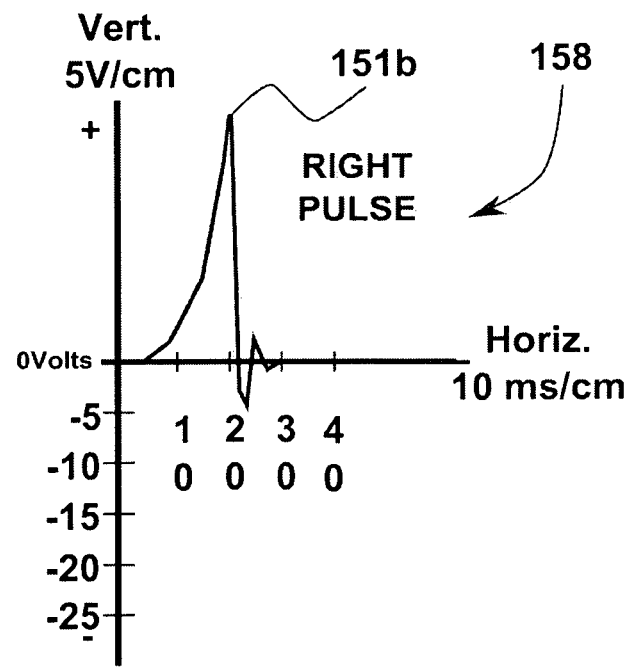
FIG. 8 is an exemplary oscilloscope trace illustration of the rocker generator embodiment of FIG. 6, showing the voltage pulse generated, at the coil terminals, as the 'right side' of the rocker is closed.

FIG. 7 is an exemplary oscilloscope time base waveform graph 156 showing the left side (shown in FIGS. 5&6) induced voltage pulse 151a generated by the instant push down on the left side 103a of the moveable rocker element 103 and simultaneously the instant upward movement of the right side 103b whose action generates a right side (shown in FIGS. 5&6) induced voltage pulse 151b shown in FIG. 8's exemplary oscilloscope time base waveform graph 158.

FIG. 8 is an exemplary oscilloscope time base waveform graph 158 showing the right side (shown in FIGS. 5&6) induced voltage pulse 151b generated by the instant push down on the right side 103b of the moveable rocker element 103 and simultaneously the instant upward movement of the left side 103a whose action generates a left side (shown in FIGS. 5&6) induced voltage pulse 151a shown in FIG. 8's exemplary oscilloscope time base waveform graph 158.

Figure 9:
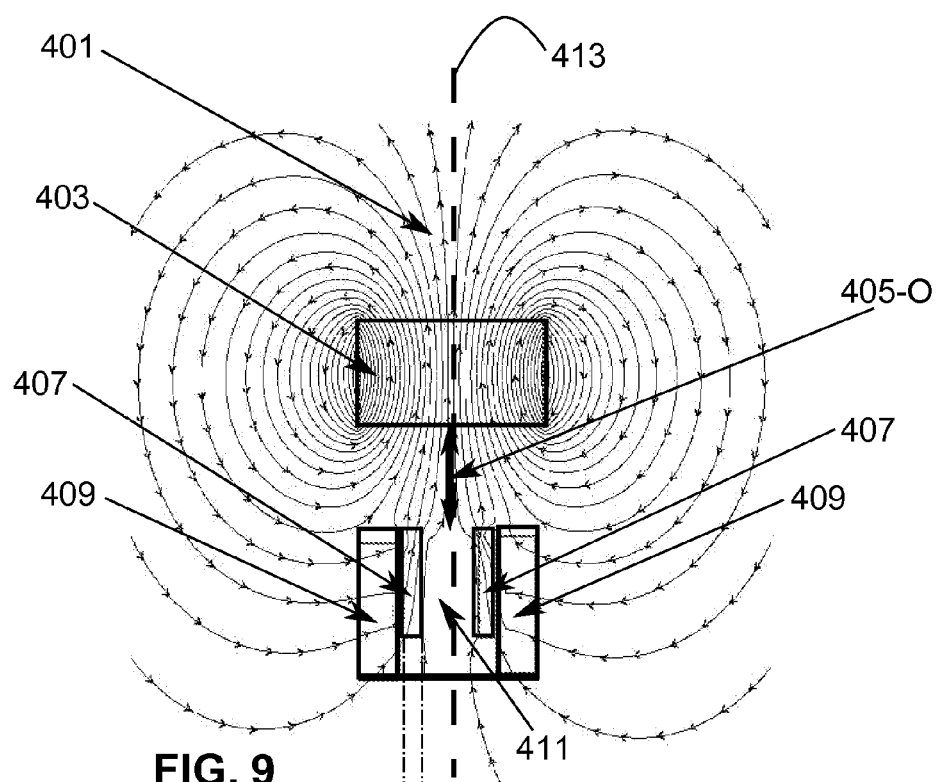
FIG. 9 is a simplified illustration of a typical neodymium disk magnet in an open magnetic circuit including an air gap between the magnet and a coil having an inner us magnetic metal (steel) core and a surrounding magnetic path.
Figure 10:
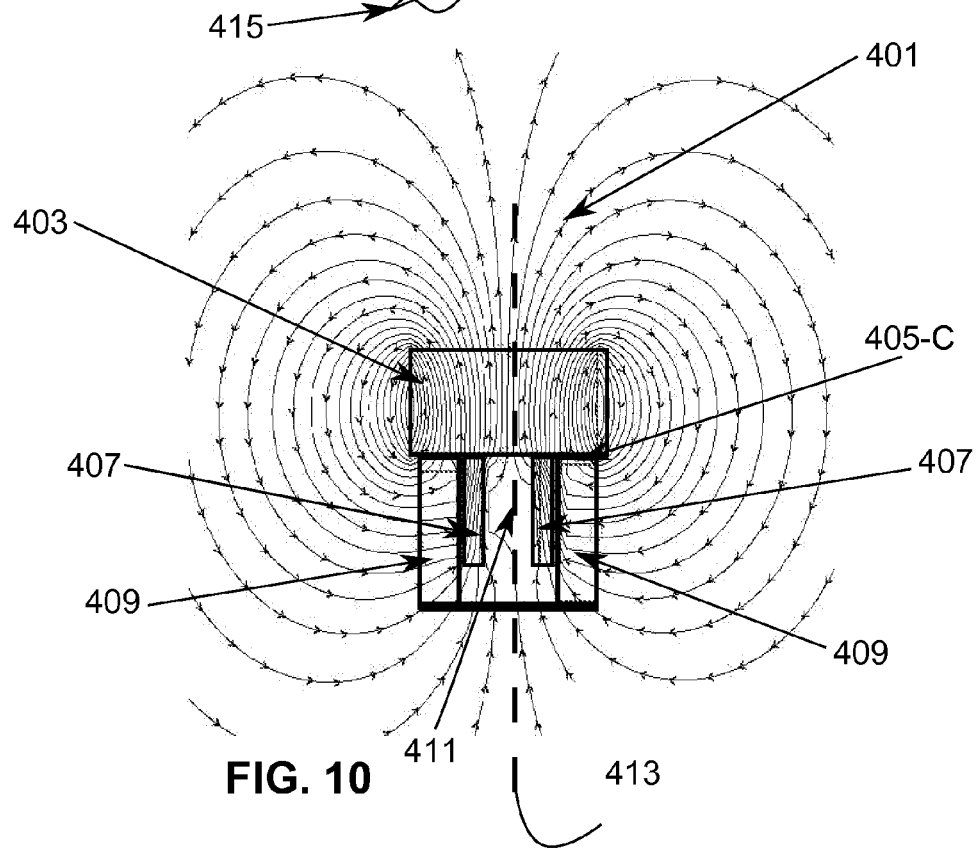
FIG. 10 is a simplified illustration of a typical neodymium disk magnet in a closed magnetic circuit of FIG. 9, but having no air gap in the magnetic circuit portion that has a concentrated magnetic field within the hollow metal core.
Figure 15:
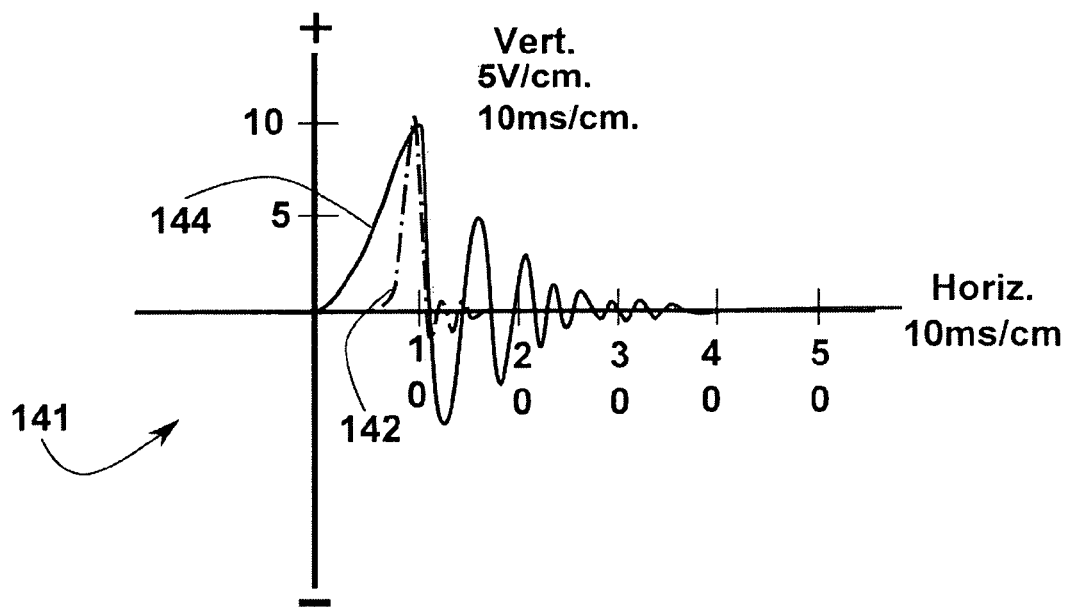
FIG. 15 is an oscilloscope time base trace graph representation 144 of the downward pushing force applied to Section (a) of the rocker embodiment of FIG. 12 and trace representation 142 of the instant upward movement of Section (b) of the rocker embodiment of FIG. 12, and an exemplary resultant induced voltages at each of the two coils output terminals.
Figure 16:
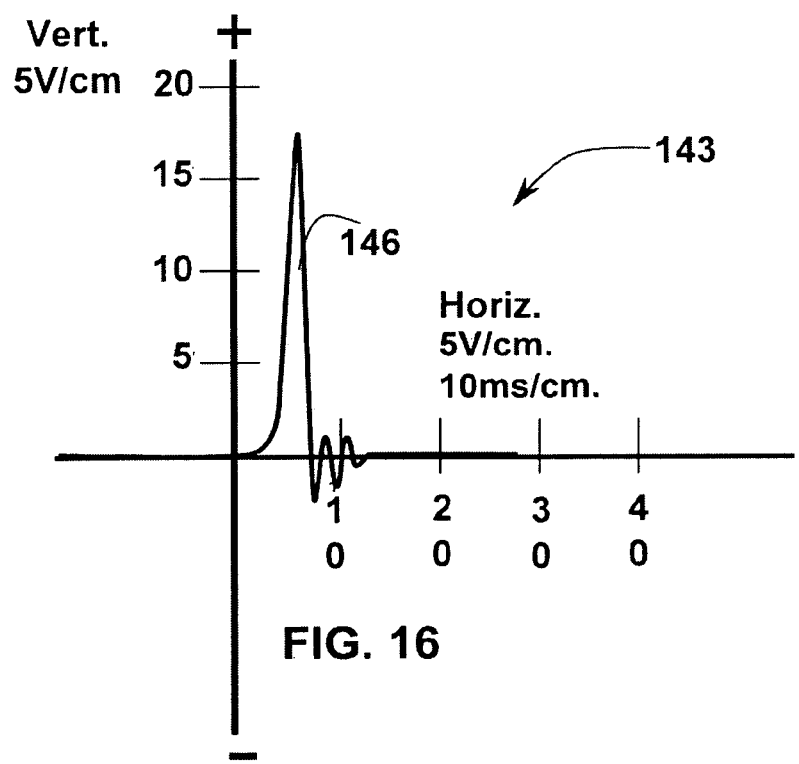
FIG. 16 shows an oscilloscope trace of the algebraic vectorial addition 146 of the two induced voltages 142 & 144 from the corresponding coils in FIG. 15 that are summed from the scope analysis waveforms 142 & 144 in FIG. 15.
Figure 17:
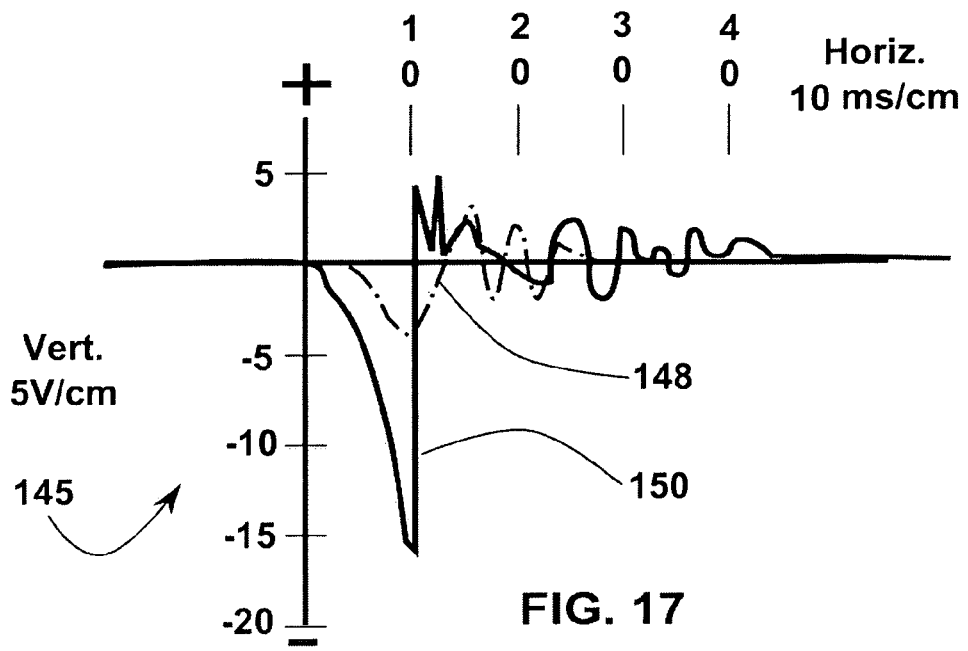
FIG. 17 is an oscilloscope time base trace graph representation 145 of the downward pushing force applied to Section (b) of the rocker embodiment of FIG. 14, and an exemplary summed resultant induced voltages 148 & 150 at series connected arrangement of the two coils output terminals Vo 135.
Figure 18:
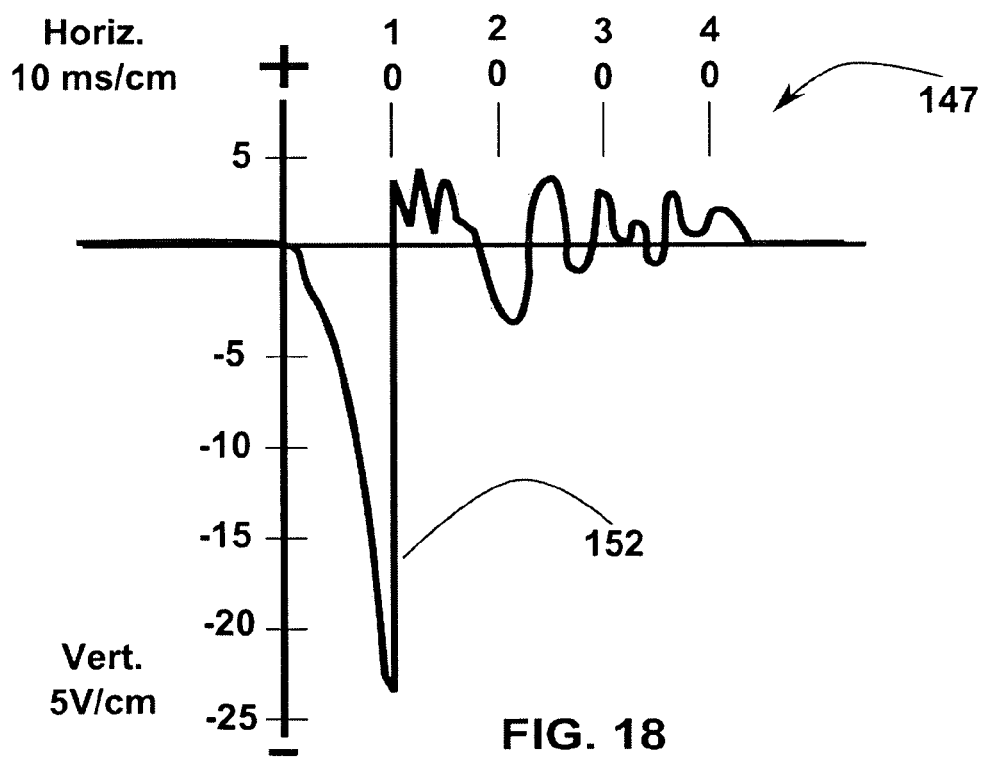
FIG. 18 is an oscilloscope trace of the algebraic addition 152 of the two induced voltages from each of two coils that are summed from the scope analysis waveforms in FIG. 17, 11, 13, 15.

In FIG. 9 the illustration shows a typical neodymium magnet 403 that is displaced by an air gap 405-O from a coil 409 that has a hollow magnetic metal core 407. The concentration of the magnetic field pattern is sparsely distributed throughout the coil windings 409. FIG. 10 shows the alternate condition wherein the neodymium magnet 403 is in direct connexion, magnetically and physically, with the magnetic metal inner core 407 that is disposed in the center of the coil 409 having an aperture 411 extending along an axis 413 along which the coil 409 is wound. The concentration of the magnetic field pattern is densely distributed throughout the coil windings 409. Therefore in a dynamic state change when the condition of FIG. 10 changes to FIG. 9, an induced voltage of one polarity relative to movement and magnetic pole direction, will be present at the coil's electrical termination points 135 (shown in FIG. 11). Conversely in a dynamic state change when the condition of FIG. 9 changes to FIG. 10, an induced voltage of opposite polarity relative to the previous movement and magnetic pole direction as was in condition of FIG. 9 changing to FIG. 10 will be produced, and this opposite polarity will be present at the coil's electrical termination points 135 (shown in FIGS. 12 & 14). The tubular, and in this example cylindrical core 407 has a thickness 415 and an outer diameter to hole 411 ratio preferably 1.5 or greater.

FIG. 11 Shows induced voltage outputs 119 and 121 of the dual (left 105a and right 105b) coil arrangement that is electrically connected in series to add; and with the positioning of the magnet's poles being opposite in polarity to each other on the left side 111a in FIG. 12 and right side 111b and they are disposed within the left side 103a and right side 103b of the movable rocker lever arm 103 shown in FIG. 1. As in a typical arrangement in the present embodiment of the invention, the left side magnet 111a is with SOUTH POLE facing the magnetic metal hollow centered core 109a and the right side magnet 111b is with NORTH POLE facing the magnetic metal hollow centered core 109b. Also in FIG. 11, there is the graph relating to the time synced movement of Section (a), which extends from pivot member 104 to the left end of the rocker lever arm 103 of lever arm 103a from position UP to substantially instantly (~1 ms) position DOWN and the two positive pulses 119 and 121 generated in coil 105a & coil 105b during that position transition 137, 5 milliseconds (+/−2 milliseconds typically) initiated by a push Force from a finger or a mechanical translator force component on Section (a) of the lever arm 103a that causes magnet 111a to move downward and magnetically and mechanically contact hollow magnetic metal center core 109a. Before this transition, when Section (a) of the lever arm 103a is displaced by a finite distance, (e.g. 3 to 5 mm}, a typical magnetic field measurement in one embodiment of the invention is 550 Gauss when the Section (a) of the lever arm 103a is in the UP position as shown in FIG. 12; and a typical measurement of 2,650 Gauss when Section (a) of the lever arm 103a is in the down position as shown in FIG. 14. Note: All magnetic field measurements taken with an Alpha Labs DC Gaussmeter Model GM-1-ST (accuracy traceble to NIST (National Institute of Science and Technology, Gaihersburg, Md.).

Furthermore when Section (b) of the lever arm 103*b* as shown in FIG. 14 is pushed downward, typical transition time of 5 milliseconds (+/−2 milliseconds), by an external force of a finger or some mechanical push force translator component, the induced voltage outputs 123 and 125 of the dual coil arrangement (typical duration of 10 to 15 msec) that can be electrically connected in series to add; and with the positioning of the magnet's coil-facing poles being opposite in polarity to each other on the right side 111*b* in FIG. 14 and left side 111*a* and they are disposed within the right side 103*b* and left side 103*a* of the rocker lever arm 103 shown in FIG. 1. As in a typical arrangement in the present embodiment of the invention, the right side magnet 111*b* is with NORTH POLE facing the magnetic metal hollow centered core 109*b* and the left side magnet 111*a* is with SOUTH POLE facing the magnetic metal hollow centered core 109*a*. Also in FIG. 13, there is the graph relating to the time synced movement of Section (b) of lever arm 103*b* from position UP to instantly position DOWN and the two negative pulses 123 & 125 generated in coil 105*b* & coil 105*a* during that position transition 139, initiated by a push Force from a finger or a mechanical force translator component on Section (b) of the lever arm 103*b* that causes magnet 111*b* to move downward and magnetically and mechanically contact tubular hollow magnetic metal center core 109*b*. Before the transition when Section (b) of the lever arm 103*b* is displaced by a finite distance such as about 3 mm measured from the closest point between coil 105*b* and magnet 111*b*, a typical magnetic field measurement in one embodiment of the invention is 550 Gauss when the Section (b) of the lever arm 103*b* is in the UP position as shown in FIG. 14; and a typical measurement of 2,650 Gauss when Section (b) of the lever arm 103*b* is in the down position as shown in FIG. 12. Note: All magnetic field measurements taken with an Alpha Labs DC Gaussmeter Model GM-1-ST (accuracy traceble to NIST (National Institute of Science and Technology, Gaihersburg, Md.).

In another embodiment of the present invention as illustrated in FIG. 19, FIG. 20, FIG. 21, FIG. 22, and FIG. 23 a quad position arrangement for both vertical and lateral SEE-SAW (rocking) movement of a cross (4 arm) member lever 603 that has disposed four neodymium magnets of disk type 605, one magnet for each of the lever 603 arms 604*a*, 604*b*, 604*c* and 604*d*. This cross member lever 603 is secured to the base 601 by a ball-joint arrangement that has a rotatable ball 611 that is free to move in an omni-directional movement within a split fingered holding joint 613. FIG. 19 is a trimetric perspective view showing the four coils of type center through hole 607 that has in each center of the coils a magnetic metal hollow core of type 609. FIG. 20 is a bottom view of the quad rocker base 601 that shows a compartment 615 that can hold a disposed typical ISM Band transmitter (702, below) circuit board or related electronic circuitry (e.g. rectifier/conditioner 706, below), as discussed generally with reference to FIG. 24, below. if for instance the rocker generator is used to instantly and momentarily power and signal an ISM Band transmitter circuit (below) to send a digitally encoded signal to a paired remote (not shown) ISM Band receiver system.

FIG. 21 is a side view of the ball 611 and joint 613 mechanism vertical and lateral omni-directional movement can provide any of the four neodymium magnets 605 can be either displaced from or be in mechanical and magnetic contact with any of the four hollow magnetic metal cores 609 that each are disposed within each of the four coils 607.

FIG. 22 is a top view showing the cross member lever arm 603 above the coil base 601 where an applied push force on the TOP portion 602*a* of the vertical member or the LEFT lateral member 602*b* of the cross lever member 603 or the BOTTOM of the vertical member 602*c* or the RIGHT member 602*d* of the cross arm 603 will cause the same or analogous action and result as illustrated in FIGS. 12 & 14 with their respective induced voltages in FIGS. 11 & 13 and the measured voltage waveforms as shown in FIGS. 15, 16, 17, & 18.

Figure 24:
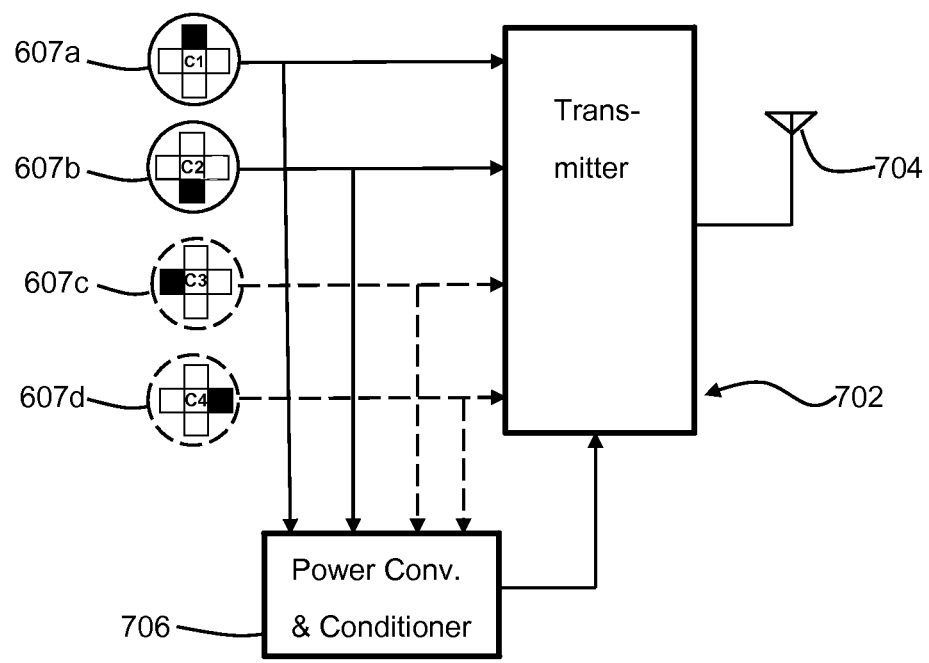
FIG. 24 is an exemplary block diagram of coil, power and transmitter elements of a system according to the present invention.

As shown in the functional block diagram of FIG. 24, the exemplary voltage rectifier 705 and regulator 709 circuit utilized to offer a steady state DC filtered voltage output 721 to give instant power generated by the action of the magnet instantly passing through the coil as the magnetic circuit between the hollow metal core 701*a* and the neodymium magnet 701*b*. As the Neodymium magnet 701 is pushed downward it makes mechanical and magnetic low reluctance contact with the hollow magnetic metal core 723, its magnetic field collapses into the hollow magnetic metal core that offers very high magnetic relative permeability (e.g. nickel plated iron 200,000) compared to that of air; with air having a magnetic relative permeability of 1. Further embodiments having 3 or more than 4 lever arms movable on paired or different relative axes are also within the scope of the present invention.

As shown in the block diagram 700 of FIG. 24, the exemplary quad position arrangement for both vertical and lateral SEE-SAW (rocking) movement of a two member lever having only arms 604*a*, 604*b*, or a 4 member "cross" member lever further having arms 604*a*, 604*b*, 604*c* and 604*d* (FIGS. 19-23 above) have corresponding electrical coils 607*a*, 607*b*, 608*c* and 607*d*, each providing an electrical signal received both by a power converter (e.g. a full-wave rectifier) and power conditioning (e.g. regulating/filtering/etc. as illustrated in the circuit diagram of FIG. 24) circuit 706, which provides operating power to the transmitter circuitry 702 (typically including data encoding circuitry) also receiving a signal from each electrical coil 607*a*, 607*b*, 608*c* and 607*d*, providing a unique signal corresponding to each of the energized coils, 607*a*-607*d*. The transmitter 702 transmits the unique signals (e.g. by ISM specifications) to a remote receiver to control remote equipment. Fewer or greater number of coils may be accommodated.

Figure 26:
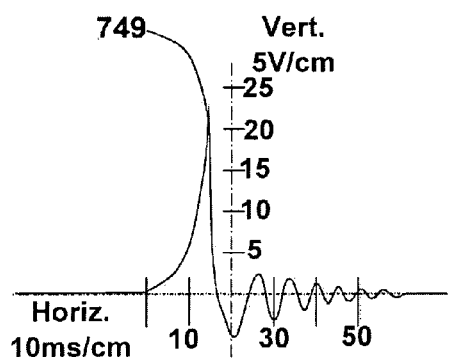
FIG. 26 is a typical waveform of a positive dominant AC pulse voltage output established at an output coil terminals according to an exemplary embodiment of FIG. 25.
Figure 28:
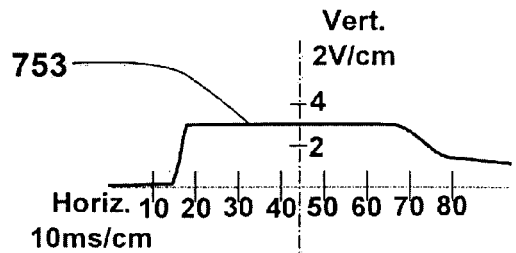
FIG. 28 is a typical waveform of a filtered and regulated DC voltage output of the AC to DC converter according to the exemplary embodiment of FIG. 25.
Figure 25:
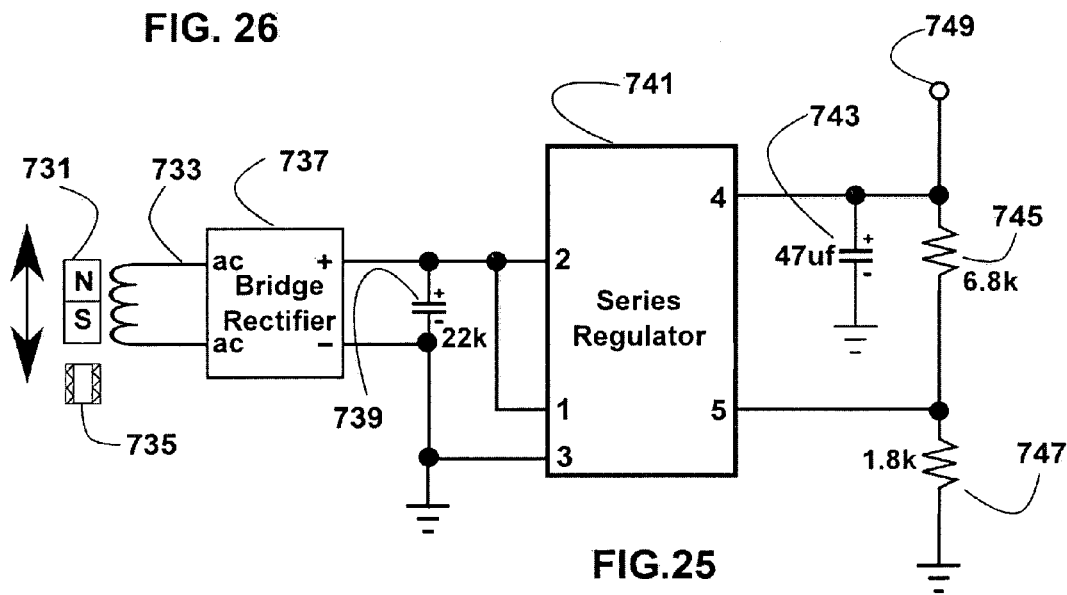
FIG. 25 is an exemplary block and schematic diagram of a rectifier, filter and voltage regulator system used to convert the AC power output of the present invention to a sustained periodic DC voltage output.
Figure 27:
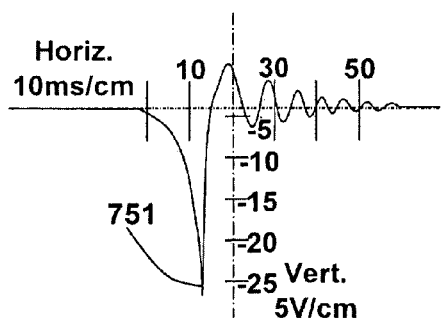
FIG. 27 is a typical waveform of a negative dominant AC pulse voltage output established at an output coil terminals according to an exemplary embodiment of FIG. 25.

As shown in the block diagram of FIG. 25, the present invention's embodiment of a neodymium magnet 731 comes in contact with a magnetic metal core 735 and induces a voltage pulse illustrated in FIG. 26 in the coil 733 that is connected to a bridge rectifier 737 that converts the pulse into a DC level voltage that is filtered by a capacitor 739 and this filtered DC voltage pulse is applied to a voltage regulator's 741 (e.g. Rohm BA00DDo series) input terminals between terminal point 2 and terminal point 3 (as a ground point). The voltage regulator 741 establishes a DC level of 3.3 volts DC (typical for an integrated ISM Band transmitter circuit module). The voltage level of 3.3 volts is determined by the values of output filter capacitor 743 and ratio of the output resistors 745 & 747, the voltage level input control terminal point 5 senses the voltage level at resistor 747 that determines where the output terminal point 4 of the regulator 741 exists and this final DC output is connected to the a terminal point 749 that has a DC regulated output voltage waveform in FIG. 28 that can be applied to power an ISM Band transmitter module 702 in FIG. 24.

These a further embodiments, modifications and substitutions made by one of ordinary skill according to the present invention are included in the scope of the present invention, which is not limited except by the claims which follow.

What is claimed is:

1. A signaling system, comprising:
   a first high permeability core having a first end and a second end, comprising non-permanent magnet material and having a dimension extending between said first end and said second end and perpendicular to a first plane, and first coil of wire disposed around said core substantially parallel to said first plane along said core dimension and proximal said core first end, said coil extending beyond said core second end, wherein said high permeability core first end comprises a surface;
   an arm movable on an axis at a pivot substantially non-coincident with said core dimension and including
      a first portion extending away from said pivot retaining a magnet thereon and having a magnetic pole movable toward and away from said high permeability core surface, and
      a second portion extending away from said pivot in a direction substantially opposite said first portion; and
   a coil support engaging said arm at said pivot and supporting said coil of wire distal to said pivot, wherein
      said magnet is movable to substantially contact said high permeability core surface and movable a selected distance from said high permeability core surface, and disposed to be movable relative to said coil of wire to contact and to separate from said high permeability core surface to provide an electrical signal from said coil.

2. The signaling system of claim 1, wherein said axis on which said arm is movable is substantially orthogonal to said high permeability core dimension.

3. The signaling system of claim 1, wherein an edge of said magnet contacts said high permeability core surface.

4. The signaling system of claim 1, wherein said magnet pole comprises a face portion engaging said high permeability core surface.

5. The signaling system of claim 1, wherein said high permeability core includes an aperture extending substantially along said high permeability core dimension.

6. The signaling system of claim 1, wherein said arm second portion is disposed to receive pressure and therefore urge said first portion magnet to separate from said high permeability core surface.

7. The signaling system of claim 6, wherein
   said coil support retains a second coil of wire having dimension and a second high permeability core disposed along said dimension and including a face at one end thereof, and wherein
   said arm second portion retains a magnet having a pole disposed to substantially face said second high permeability core and substantially make contact therewith when said arm first portion magnet is separated from said first high permeability core, and allow said arm first portion magnet to substantially contact said first high permeability core when said arm second portion magnet is spaced from said second high permeability core.

8. The signaling system of claim 7, wherein said second high permeability core includes a coil thereon extending along said dimension and providing an electrical signal therefrom as a result of motion of said second arm magnet relative to said second high permeability core.

9. The signaling system of claim 8, wherein said arm comprises a first bi-stable state including a minimal spacing between said arm first portion magnet and said first high permeability core surface and a second bi-stable state including a minimal spacing between said arm second portion magnet and said second high permeability core surface.

10. The signaling system of claim 1, wherein said arm first portion and said arm second portion are movable in a first portion plane, and said arm includes a third portion extending from said pivot and disposed to be movable non-parallel to arm first portion and said second portion and non-parallel to said first portion plane.

11. The signaling system of claim 10, wherein
   said coil support includes a third coil have a corresponding third core therein, and wherein
   said third portion includes a magnet thereon confronting said third coil and disposed to move toward and away from said third core to thereby induce a corresponding voltage in said third coil.

12. The signaling system of claim 11, wherein said arm includes a fourth portion extending from said pivot and disposed to be movable and non-parallel to arm first portion and said arm second portion and non-parallel to said first portion plane.

13. The signaling system of claim 12, wherein said third and said fourth arm portion extend along an axis substantially perpendicular to at least one of said first and said second arm portions.

14. The signaling system of claim 12, wherein
   said coil support includes a fourth coil have a corresponding fourth core therein, and wherein
   said fourth portion includes a magnet thereon confronting said fourth coil and disposed to move toward and away from said fourth core to thereby induce a corresponding voltage in said fourth coil.

15. The signaling system of claim 1, further including a power conditioning circuit receiving said coil electrical signal and providing selected electrical power therefrom.

16. The signaling system of claim 1, further including a transmitter responsive to said coil electrical signal providing a transmitted signal in response to abrupt motion of said arm.

17. The signaling system of claim 16, wherein said coil support includes a recess therein adapted to receive and retain said transmitter.

18. The signaling system of claim 1, wherein said core is a substantially tubular metal core.

19. The signaling system of claim 17, wherein said core extends sufficiently beyond said coil to permit said magnet to contact said core.

20. A bi-stable power pulse generator, comprising:
   a pair of coils;
   a corresponding pair of high permeability hollow cores each extending through one of said coils and each having an end surface without a flange and a substantially uniform outer surface diameter; and
   an arm extending along a line and substantially bisected by a pivot axis on which said arm pivots and including two magnets each spaced from a pivot and substantially confronting a different one of said hollow core end surfaces, said pivot axis being disposed to allow said magnets to confront a corresponding one of said hollow core end surfaces, alternately contacting and resisting separation from one of said hollow core end surfaces and the other of said hollow core end surfaces upon application of corresponding alternating external forces applied to said arm, and providing a pulse of electrical power from at least one of said pair of coils upon magnet separation from one of said hollow core end surfaces.

\* \* \* \* \*